United States Patent [19]

Svanholm

[11] Patent Number: 4,902,211

[45] Date of Patent: Feb. 20, 1990

[54] PROCESS AND PLANT FOR MANUFACTURE OF AERATED CONCRETE

[75] Inventor: Göte Svanholm, Örebro, Sweden

[73] Assignee: G. Svanholm Engineering AB, Örebro, Sweden

[21] Appl. No.: 229,779

[22] Filed: Aug. 5, 1988

Related U.S. Application Data

[60] Continuation of Ser. No. 875,215, Jun. 17, 1986, abandoned, which is a division of Ser. No. 572,545, Jan. 20, 1984, Pat. No. 4,613,472.

[30] Foreign Application Priority Data

Jan. 24, 1983 [SE] Sweden .............................. 8300342

[51] Int. Cl.$^4$ ..................... B28B 15/00; B28B 7/04; B28B 13/02
[52] U.S. Cl. ..................... 425/88; 249/112; 249/170; 425/200; 425/253; 425/442; 425/447; 425/452
[58] Field of Search .................. 425/62-64, 425/88, 253, 259, 261, 300, 307, 308, 315, 316, 413, 441, 442, 443, 452, 447, 454, 200; 264/DIG. 43; 249/112, 170

[56] References Cited

U.S. PATENT DOCUMENTS

| 13,042 | 6/1855 | Plumbe | 425/307 |
|---|---|---|---|
| 2,054,001 | 9/1936 | Polak | 425/413 |
| 2,567,549 | 9/1951 | Christensen | 425/452 |
| 2,941,253 | 6/1960 | Jakobsson | 264/DIG. 43 |
| 3,223,379 | 12/1965 | Erickson | 425/452 |
| 3,255,866 | 6/1966 | Giulde et al. | 425/452 |
| 3,344,492 | 10/1967 | Eggeling et al. | 425/88 |
| 3,407,457 | 10/1968 | Blom | 425/88 |
| 3,499,069 | 3/1970 | Seigle | 425/88 |
| 3,679,340 | 7/1972 | Springs | 425/88 |
| 3,759,481 | 9/1973 | Scott | 249/112 |
| 4,274,824 | 6/1981 | Mullins | 425/452 |
| 4,298,323 | 11/1981 | Haydt, Jr. | 249/78 |
| 4,376,086 | 3/1983 | Schubert et al. | 264/42 |

FOREIGN PATENT DOCUMENTS

| 161506 | 11/1957 | Sweden | 425/308 |
|---|---|---|---|
| 374049 | 2/1975 | Sweden | 425/308 |

Primary Examiner—James Housel

[57] ABSTRACT

A plant for manufacturing aerated concrete products includes a casting station where a quick-stiffening mixture is prepared and poured into a mold. To form the mold, a movable wall arrangement disposed at the casting station is temporarily united with a transportable mold bottom. After the poured mixture hardens to a semiplastic body, the semiplastic body is removed along with the mold bottom and another mold bottom is assembled with the wall arrangement to receive the next pouring of mixture. As a result, the capital investment required for the plant is minimized. Wires on the wall arrangement may be used to automatically cut the semiplastic body into blocks. The stiffening time for forming the semiplastic body is kept short so that the pacing time between consecutive pourings can also be kept short. The semiplastic bodies on the mold bottoms are stacked on trucks which are guided by tracks to autoclaves at a steam curing station.

14 Claims, 4 Drawing Sheets

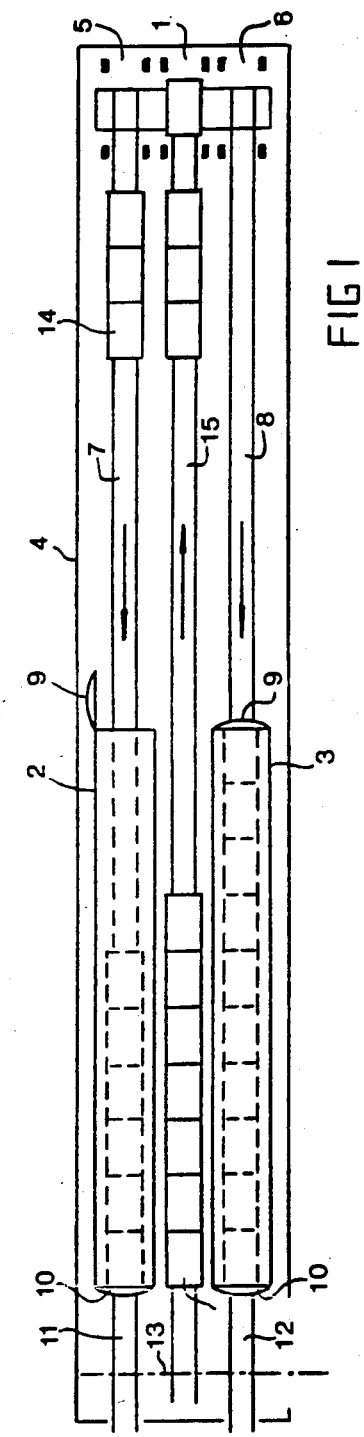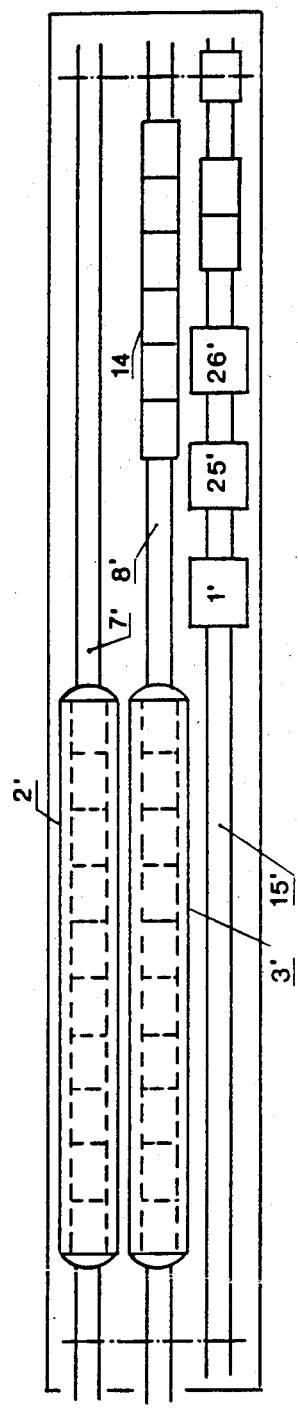

PROCESS AND PLANT FOR MANUFACTURE OF AERATED CONCRETE

This is a continuation of application Ser. No. 06/875,215 filed June 17th, 1986, now abandoned. Application Ser. No. 06/875,215 was a division of application Ser. No. 06/572,545, filed Jan. 20th, 1984, which issued a U.S. Pat. No. 4,613,472.

BACKGROUND OF THE INVENTION

Traditional aerated concrete, or gas concrete, is usually produced in the following way. One or several silica containing materials, such as sand, shale ashes or similar materials, as well as one or several calcareous, possibly hydraulic, binders, such as lime and/or cement, are mixed with a rising agent—which in the case of aerated concrete is aluminium powder—in water. When these materials are homogenized and in close contact, the lime (CaO) of the binder reacts with the water and the silica ($SiO_2$) material and forms what can generally be described as a calcium silicate hydrate mass at the same time as the aluminium powder reacts with water to develop hydrogen gas that gives the mass macroporosity. This pore formation means in practice that the mass rises from a limited initial volume to a relatively large volume. (The finished aerated concrete usually has a density of 0.4–0.65 $kg/dm^3$).

In practice, the rising of the mass forming components takes place in a special mould, into which they are poured from a special mixing device. After rising, the mass is allowed to stiffen in the mould during a special stiffening time. During this stiffening time, a semiplastic body is formed which has a relatively low strength but which is sufficiently stiff to keep together without support from the mould and can be transported on its own. As soon as this stiffness is achieved, the body is released from the mould, whereupon the body, in one way or the other, is divided by cutting devices such as wires into separate elements having shapes that are suitable for use in the building industry. The divided body is brought to an autoclaving station in which it, for a certain period of time, is steam cured at high pressure and high temperature (170°-200° C.) in order to obtain suitable strength. Finally the body is transported from the autoclaving station to an unloading station in which the elements of each body are separated from each other and packaged and/or transported to a dispatch place.

During the above mentioned reaction between the calcareous binder and water, heat is developed. Professionals have always tried to keep this heat at the lowest possible level since too fast a temperature increase in the mass produces difficulties in controlling the rising process. For this reason, hard burnt lime, which reacts slowly with limited development of heat, has been used throughout for the manufacture of aerated concrete on the basis of lime. This has been the case, independently of whether lime has been included in the formula as the sole binder or has been mixed with larger or smaller amounts of portland cement.

Although the use of hard burnt, slow reacting lime has ensured good control during the casting/rising process, the investigations which lead to this invention have shown that a multitude of inconveniences are connected with the use of slow reacting binders, especially if the manufacture of aerated concrete is seen from a wider perspective. A not insignificant inconvenience is that hard burnt lime is considerably more expensive than soft burnt, highly reactive lime of the type that, e.g., is used in steel manufacture (hereunder called "Steel works lime"). Another inconvenience—with more profound consequences—is that the slow reacting lime gives a relatively long stiffening time. Thus the stiffening time is usually more than 45 minutes whereas the pacing time, i.e. the time between two consecutive castings, often is as short as four to five minutes in order to obtain a high production capacity. This means, of course, that the production or manufacturing plant must have at least 12–15 moulds that are working at the same time since the body cannot be released from the mould and be divided until the necessary stiffening time is ended. In practice, however, the number of moulds is considerably greater, e.g. 20 or more, in order to fill the demands on spare- or buffer capacity.

Moulds are expensive to manufacture as well as to maintain and a considerable amount of space in the factory is necessary, something that leads to high investment costs and running costs. High investment costs mean that every plant must have high production capacity; all this has, in practice, led to erection of big, highly effective factory units, from which large amounts of different products are delivered. Manufacturing aerated concrete in this manner, however, becomes more and more untenable, especially in sparsely populated areas, where high transportation costs in combination with high investment costs make the cost for delivery of the elements, capital cost included, unacceptably high.

SUMMARY OF THE INVENTION

The objects of the present invention are to remove the inconveniences related above and to create a substantially improved ratio between production and investment for the manufacture of aerated concrete. This is achieved, in accordance with the characteristic traits of the invention, by always keeping the stiffening time (A) referred to above shorter than the pacing time (T) between two consecutive castings. This makes it possible to use mainly one mould only and to decrease the space required in the factory or plant to a minimum.

In accordance with a preferred way of implementing the invention, it is possible to achieve a stiffening time which is short in comparison with the pacing time by using an extremely high-reactive fast binder, e.g. of the steel works lime type, which will effect an exceptionally fast stiffening of the mass while keeping an optimally short pacing time. In rare cases, when demands on production capacity (i.e. the number of produced elements per unit of time) are not so great, it is, on the other hand, possible to implement the desired relation between pacing time and stiffening time by an increase of the pacing time.

The invention is preferably practiced in a plant having trucks with two mould bottoms that cooperate sequentially with a single, movable wall arrangement, which may have wires in order to cut the stiffened bodies into separate elements. The mould formed by a mould bottom and the wall arrangement receives mixed material from a special mixing device and, after the material has stiffened, the wall arrangement is removed. Two stiffened bodies that are formed in this way are carried by the truck to an autoclave for curing.

BRIEF DESCRIPTION OF THE DRAWINGS

FIG. 1 is a highly simplified top plan view of a first implementation of the invention;

FIG. 2 is a similar top plan view of an alternative second implementation;

DESCRIPTION OF THE PREFERRED EMBODIMENT

Figure 3A:
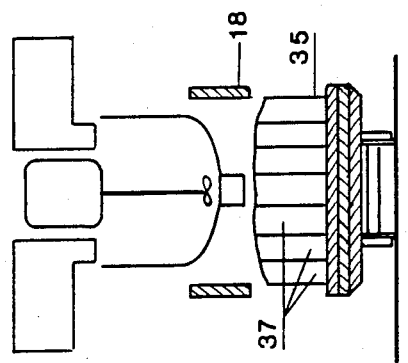
FIGS. 3A-3D are similarly highly simplified sectional views through a casting station in the plant in FIG. 1, and show the station during different steps of the process.

The extremely simple plant, shown in FIG. 1, comprises in its main parts a casting station 1 and a steam curing station, comprising two parallel autoclaves 2,3. The plant is in a suitable way housed in a factory building 4. The casting station 1 is centrally located between two waiting positions 5 and 6 respectively. These waiting positions are connected with the autoclaves 2,3 by transport tracks 7,8 for the introduction of bodies into the autoclaves in the direction indicated by the arrows.

Each autoclave has two doors 9 and 10, one at the entrance end and one at the exit end. At the exit there are further transport tracks 11 and 12 respectively which are connected by a traverse transporter 13 which in the drawing is indicated by a line of dots and dashes.

The plant also comprises a number of trucks 14, each of which has one or more slab-shaped bottoms which, in combination with a wall arrangement in the casting station 1, can form the necessary mould. As is seen in FIG. 1, a return track 15 for the trucks 14 runs from the transverse transporter 13 to the casting problem 1. According to a special implementation of the invention, this return track is situated between the autoclaves 2,3. In this way, a compact plan with minimized transport distances for the trucks is achieved.

The casting station 1 further comprises a transverse transporter (not shown) for moving a mould bottom and/or truck between the station and either of the waiting positions 5,6. Further, at these waiting positions, there should exist equipment for lifting and lowering of the relevant bottom or truck so that it will be possible to position one body above another on the truck before it enters the autoclave in question. The casting station could further comprise one or several cap scrapers (not shown) by which the cap that always develops at the top of the body can be removed and returned to the next mix of components, e.g. through the feed devices 31,32 (see FIG. 3) in the mixing device. Such cap scrapers can, with advantage, be built according to the suction principle and be positioned stationary at the sides of the casting station so that they, during transportation of the body between the casting station and the relevant waiting position, automatically cut and remove the cap for conveyance to the next mix.

Figure 4:
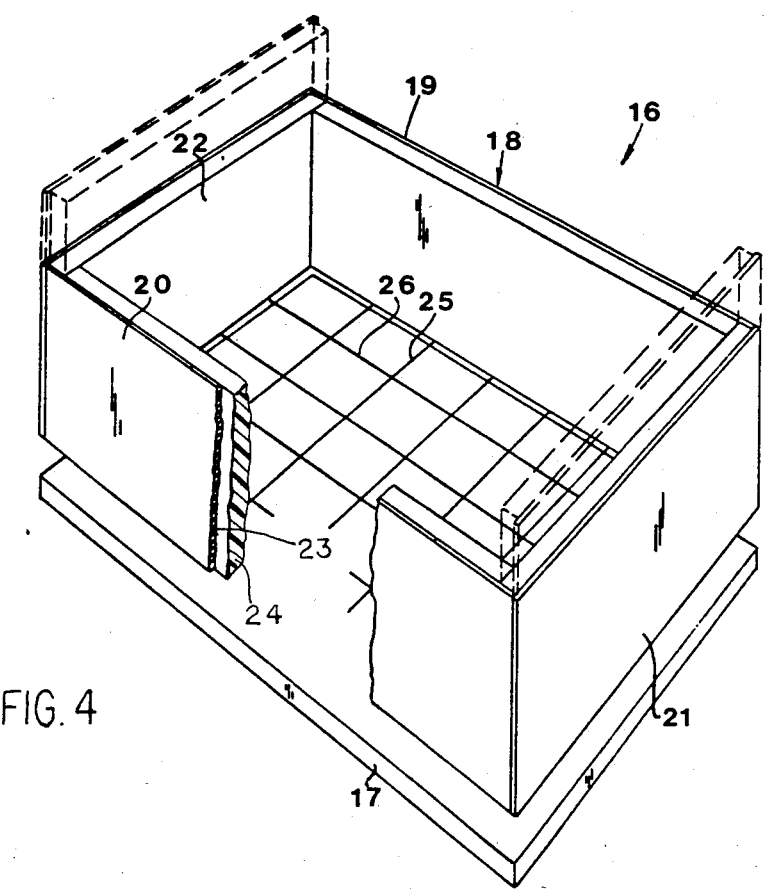
FIG. 4 is a partly cut-away perspective drawing, illustrating a mould in the plant.

Reference is made to FIG. 4, which shows the assembly of a mould 16 according to the invention. The mould comprises a bottom 17, which can be provided as a comparatively simple plate of sheet steel or similar material, and a wall arrangement, in its entirety designated as 18. The wall arrangement 18 can be built as a number of outer load bearing panels or sheets 23 on the inside of which heat resistant sheets 24 of, e.g. polyurethane foam, are fixed. The use of such porous insulating sheets ensures that the mould wall it kept comparatively cool, a factor that is of vital importance insofar as the mould wall will be in contact with hot mixes with short intervals between consecutive castings. Wall arrangement 18 comprises two opposite long side walls 19,20 as well as two short side walls 21,22. The dimensions of the mould are: length=2.5 m, width=1.5 m and height=0.6 m, and in the mould a parallelepiped body of 2.25 cu. m can be cast. According to the invention, the plant may comprise but one wall arrangement 18, positioned in the casting station 1, whereas the mould bottom 17 is part of or follows each of the earlier mentioned trucks 14. The mould 16 can thus only be assembled in the casting station 1 by a suitable lowering of the wall arrangement 18 onto the bottom 17 whereby suitable seals effect the tightness between the mould bottom and the wall arrangement.

In the lower part of the wall arrangement 18, towards the bottom 17, it is advantageous to arrange cutting devices 25,26 in the form of wires in order to automatically divide the body that has stiffened in the mould into smaller elements as the wall arrangement is lifted from the mould bottom. To avoid adverse effects when cutting or dividing with these wires, it is possible to let the shorter walls 21,22, to which the longer wires 26 are connected, move upwards from the bottom 17 earlier than the longer walls 19,20, which carry the shorter wires 25, as is indicated by the dotted lines above the shorter walls. In this way, the wires 26 will move through the mass at a distance from the wires 25. It is, of course, also possible to change the order of movement and to let the wires 25 move before the wires 26. It is equally possible to let one of the opposite walls move before the other one so that the wires in question move obliquely. To avoid lateral movement of the wires at the beginning of the cutting operation, it is possible to arrange grooves or knobs (not shown) on the bottom 17, or the wires can be held by a paper or foil that, during casting, becomes so softened by the mix that it does not give resistance to the wires when cutting begins.

Turning next to FIG. 3, two mould bottoms are advantageously associated with each truck 14. Either each truck can have two loose bottoms or one fixed bottom 17 and one loose bottom 17', as is shown in FIG. 3A. Furthermore a number of loose pillar shaped supports 34 belong to each trunk (see FIG. 3D) and can be used for carrying the loose mould bottom 17' at a distance above the fixed bottom 17 so that two bodies 35,36 can be positioned one above the other on the truck as is shown in FIG. 3D.

By putting two bodies on each truck in this way, an optimal utilization of the autoclaves, which are circular in cross section, is achieved.

If desired, the mould can—still in accordance with the invention—be provided with one or more partitions.

In FIG. 3A is shown a special mixing device, generally designated 27. This device comprises a mixing impeller 29 which is driven by a suitable power source 28 and which is situated in the lower part of a preferably mainly cylindrical mixing vessel 30 having a valve device (not shown) at the bottom. The mixing device also comprises a number of feed devices 31,32 which contain and/or feed the components into the mixing vessel.

Before the mode of operation of the plant shown in the drawings is described in detail, a formula suitable for the manufacture of aerated concrete in the plant shall be given. A preferred composition will comprise:

| | |
|---|---|
| 60-70%, | and preferably about 65%, by weight silica material (sand) |
| 18-24%, | and preferably about 21%, by weight quick reacting lime |
| 2-6%, | and preferably about 4%, by weight portland cement |
| 6-14%, | and preferably about 10%, by weight return material (from previous mix) and aluminum powder about 0.1% by weight |

Figure 6:
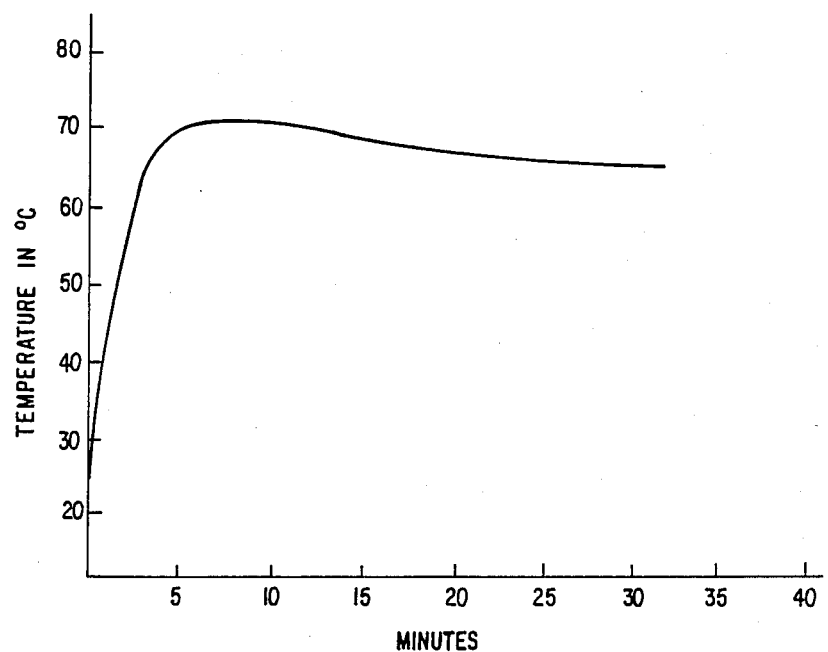
FIG. 6 illustrates the slaking curve of quick reacting lime that is suitable for use when practising the invention.

Water is added in such amount that the water/solids ratio will be 0.57/1. The quick reacting lime referred to above is of the steel works type and has a slaking curve, when tested according to the German standard method, as illustrated in FIG. 6.

When the components in question are mixed and homogenized, they should initially have as low a temperature as possible to ensure that the temperature in the mix during the following slaking and stiffening procedure does not increase to uncontrolled levels.

The plant described above works in the following way: An initial position is illustrated in FIG. 3A. The truck 14 has entered the casting station 1 with the bottom 17' on bottom 17 and the mould wall arrangement 18 connected with the bottom 17'. In this position, the components are fed into the mixing vessel via the feed devices 31,32. In the vessel, the components are subjected to intensive mixing by the impeller 29. The time for this mixing is extremely short and in practice only 40 to 60 seconds. Immediately after mixing is completed, the impeller is stopped and the valve device is opened so that the mixer can be emptied. The components flow out and rise to form the body designated by 35.

After rising is completed, the mass is allowed to stiffen during a stiffening time A that, when the formula above is used, is 9 to 10 minutes. During the stiffening period, the body attains sufficient stiffness to stand up without the support of the mould sides, which accordingly are lifted in accordance with FIG. 3B to a position above the body. At the same time, the body is divided into separate smaller elements 37 by the wires 25,26 illustrated in FIG. 4.

In the next step, (FIG. 3C), the bottom 17' and the stiffened and divided body 35 are moved to the waiting position 5. This is performed by the previously mentioned transporter (not shown) at casting station 1, and at the same time the cap is removed as earlier described. The body 35 which has been moved to waiting position 5 is lifted to the position shown in FIG. 3C, in which the bottom 17' is positioned at a certain level above the top of the previous position of the body.

Figure 3C:
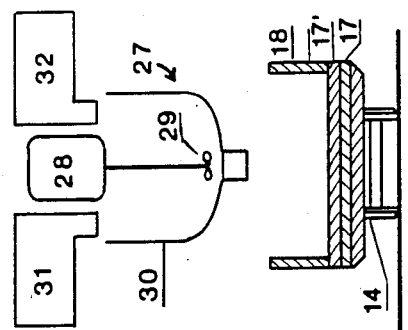

FIG. 3C also shows that the wall arrangement is lowered against the bottom 17.

Figure 3B:
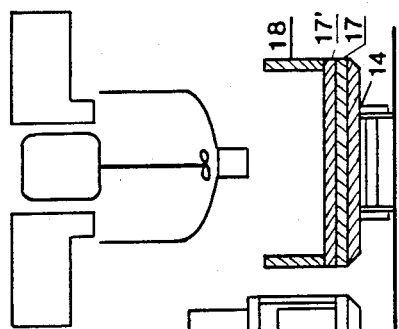
Figure 3D:
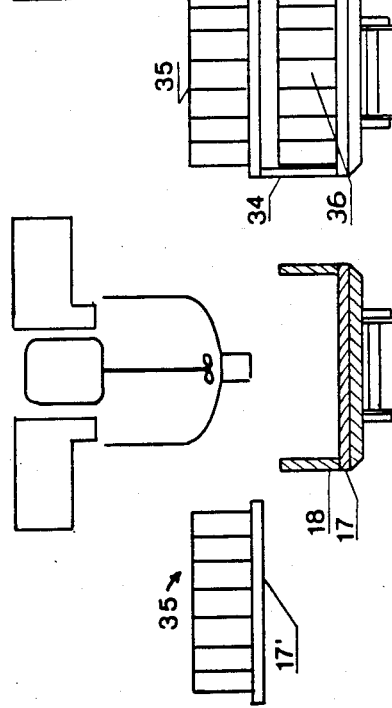

After this the casting and dividing process described in connection with FIG. 3A and 3B is repeated so that a new body 36 is formed in accordance with FIG. 3D. This figure shows how the truck 14 with the body 36 resting upon the bottom 17 has been moved to the waiting position 5, where the supports 34 have been inserted between the two bottoms 17 and 17', with the latter resting on the supports. The truck is now ready to be moved into the autoclave. FIG. 3D also illustrates that a new truck 14, with bottoms 17 and 17', has entered the casting station where the process already described is repeated.

Suppose that, in the plant illustrated in FIG. 1, there are 30 trucks 14 each with two bottoms 17,17'. Each autoclave can hold 10 trucks simultaneously or, in other words, 20 bodies. The cycle time of the autoclaves is eight hours and the plant is supposed to run in three shifts, a new autoclave cycle starting every four hours. From this it follows that the pacing time T is 12 minutes, which time exceeds the above mentioned stiffening time by a good margin. When the autoclave content is changed, the trunks with the cured bodies are pushed or pulled out of the factory proper, onto the tracks 11 and 12 which are waiting tracks. The unloading man pulls the trucks back as the unloading proceeds.

The unloading is performed with the help of a hoist that can lift the bodies as well as the trucks and bottoms. The bodies are lifted off and placed on palletizing or packaging tables and the trucks with the bottoms are put on the return track 15. The unloader has 24 minutes for each trunk. The absolutely necessary personnel in each shift comprise, apart from the unloader, an autoclave attendant who also will watch the boiler plant, the caster and the grinder. To this is added personnel working daytime, such as a laboratory man, dispatch staff, management and maintenance staff.

In FIG. 2 is shown an alternative design for the plant in which the two autoclaves 2',3' are positioned close to each other and the return track 15' is positioned at the side of the autoclaves. Also the casting station 1' is positioned at the side of the two tracks 7' and 8' and over the return track 15'. In this way, the casting station can be made simpler than in the previous design and the cutting can take place in two separate stations 25' and 26'.

Figures 5A, 5B:
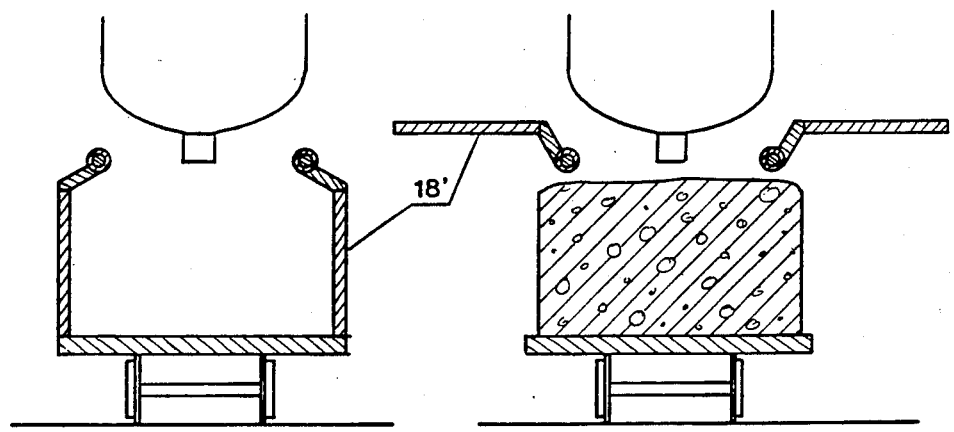
FIGS. 5A and 5B show an alternative form of the mould.

In this case the wall arrangement can, with advantage, be made with swing up sides 18' as illustrated in FIG. 5.

The extremely short reaction time of the components can in practice be achieved by dry grinding of the components, preferably by grinding them together. If the mill in question is adequately dimensioned in relation to the capacity of the plant, previously used large silo capacities can be dispensed with and it will be sufficient to employ a mill and a container for an hour of production or less.

The advantages of the invention are obvious since it makes it possible to erect a factory in which the relation between production and investment is optimal.

It is clear that the invention is not limited to the designs described and shown in the drawings. Thus it is possible to use the principle according to the invention also during manufacture to calcium silicate hydrate materials other than conventional aerated concrete. E.g., the principle of the invention can be utilized in connection with manufacture of foam- or all- concrete and also during manufacture of aerated concrete modified in certain ways, e.g. a material manufactured without steam curing and/or without the use of pore forming material. Further the division of the body into smaller elements can be left out, in which case the body can be utilized for grinding to finely disperse calcium silicate hydrate material for other purposes than building. The plant can, if so desired, have two or more moulds, one or more of the moulds being spares. Furthermore the stiffening time can be as short as 7 or 8 minutes. Instead of transporting the bodies horizontally, it is possible to turn them on end before cutting or autoclaving. Instead of trucks, it is possible to use other means of transportation, e.g. various types of chain transporters. Also other modifications are possible within the framework of the invention.

I claim:

1. A plant for the manufacture of aerated concrete products, comprising: casting station means for the preparation of quick-stiffening mixtures of at least one silica containing material, at least one calcareous binder, a rising agent, and water, the casting station means including means for pouring mixtures at periodic intervals that are spaced apart by a pacing time; and a plurality of molds to receive the pourings and retain them for a stiffening time until they harden to semiplastic bodies in the molds, the stiffening time being shorter than the pacing time between two consecutive pourings; wherein the molds are upwardly open and include a single wall arrangement disposed at the pouring means and a plurality of bottoms transportable past the pouring means, the bottoms being each in turn connected with the wall arrangement only during pouring and stiffening, and wherein the plant further includes means for swinging the wall arrangement away from the bottoms to permit transport of the semiplastic bodies on the bottoms.

2. A plant according to claim 1, further comprising an autoclaving station, truck means for transporting the bottoms and semiplastic bodies thereon to the autoclaving station, and means for stacking the bodies one above the other on the truck means so that the bodies are transported at least two at a time.

3. A plant according to claim 1, wherein the wall arrangement is permanently disposed directly underneath the pouring means.

4. A plant according to claim 1, wherein the quick-stiffening mixtures are exothermic, and wherein the wall arrangement includes load-bearing panels and insulation means inward of the load-bearing panels for thermally shielding the load-bearing panels from heat released by the mixtures.

5. A plant for the manufacture of aerated concrete products, comprising:
    a plurality of bottoms;
    means for moving the bottoms along a path;
    a casting station which is disposed along the path and which includes
        a vessel,
        means for preparing batches of a quick-stiffening mixture in the vessel, the quick-stiffening material including at least silica material, rising agent, calcareous binding material, and water, each batch becoming semiplastic upon expiration of a stiffening time after the material has been mixed,
    a wall arrangement disposed adjacent the vessel, the wall arrangement comprising a plurality of walls, and
    means for moving the wall arrangement between a first position, wherein the wall arrangement together with a respective bottom form an upwardly open mold for receiving a batch of mixture and retaining said batch during the stiffening time, and a second position wherein the wall arrangement is swung away from the bottom and semiplastic material supported thereon so that another bottom can be used with the wall arrangement to form an upwardly open mold.

6. A plant according to claim 5, wherein the means for moving the bottoms comprises a plurality of trucks.

7. A plant according to claim 6, further comprising an autoclave disposed along the path at a position spaced apart from the casting station, and means for stacking bottoms on the trucks so that each truck transports at least two stacked bottoms, and semiplastic material supported thereon, to the autoclave.

8. A plant according to claim 6, further comprising an autoclave disposed along the path at a position spaced apart from the casting station, a first track segment running along a portion of the path and passing through the autoclave, and a second track segment running along another portion of the path and passing through the casting station, and wherein the trucks roll along the track segments.

9. A plant according to claim 8, further comprising a second autoclave and a third track segment passing through the second autoclave.

10. A plant according to claim 9, wherein the track segments are substantially straight and parallel to one another.

11. A plant according to claim 9, wherein the third track segment is between the first and second track segments, the autoclaves lying adjacent one another.

12. A plant according to claim 9, wherein the first track segment lies between the second and third track segments, the autoclaves lying on opposite sides of the first track segment.

13. A plant according to claim 5, wherein the wall arrangement is permanently disposed directly underneath the vessel.

14. A plant according to claim 5, wherein the batches of quick-stiffening mixture are exothermic, and wherein the wall arrangement includes load-bearing panels and insulation means inward of the load-bearing panels for thermally shielding the load-bearing panels from heat released by the batches.

* * * * *